US 11,025,851 B2

(12) United States Patent
Millet

(10) Patent No.: US 11,025,851 B2
(45) Date of Patent: Jun. 1, 2021

(54) FAST IMAGE SENSOR WITH PIXEL BINNING

(71) Applicant: COMMISSARIAT A L'ENERGIE ATOMIQUE ET AUX ENERGIES ALTERNATIVES, Paris (FR)

(72) Inventor: Laurent Millet, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 16/584,122

(22) Filed: Sep. 26, 2019

(65) Prior Publication Data

US 2020/0106980 A1   Apr. 2, 2020

(30) Foreign Application Priority Data

Sep. 27, 2018   (FR) ...................... 18 58870

(51) Int. Cl.
| | | |
|---|---|---|
| *H04N 5/374* | (2011.01) | |
| *H04N 5/378* | (2011.01) | |
| *H04N 5/347* | (2011.01) | |

(52) U.S. Cl.
CPC ............. *H04N 5/378* (2013.01); *H04N 5/347* (2013.01)

(58) Field of Classification Search
None
See application file for complete search history.

(56) References Cited

U.S. PATENT DOCUMENTS

| | | | |
|---|---|---|---|
| 2009/0218476 A1* | 9/2009 | Kameshima | H04N 5/378 250/208.1 |
| 2010/0118167 A1 | 5/2010 | Johnson | |
| 2011/0068860 A1 | 3/2011 | Baud | |
| 2018/0247969 A1 | 8/2018 | Mori et al. | |

OTHER PUBLICATIONS

French Preliminary Search Report dated May 20, 2019 in French Application 18 58870 filed on Sep. 27, 2018 (with English Translation of Categories of Cited Documents).
L. Wu, et al., "In-Pixel Storage Techniques for CMOS Burst-Mode Ultra-High-Speed Imagers", Conference: 2017 International Image Sensors Workshop, 2017, 4 pages.

* cited by examiner

*Primary Examiner* — Mark T Monk
(74) *Attorney, Agent, or Firm* — Oblon, McClelland, Maier & Neustadt, L.L.P.

(57) ABSTRACT

An image sensor including (a) an array of pixels, each of which includes: (a1) a photodetector; and (a2) a read-out circuit coupled to the photodetector and including an active amplifying element; and (b) pixel binning means configured to form macropixels such that, in each macropixel, the inputs of the read-out circuits of at least two pixels are coupled to one another, and the outputs of the read-out circuits of said pixels are coupled to the input of a single memory element including a capacitor; wherein the output of each read-out circuit is coupled to an input of a memory element that is different from those of the other pixels; and wherein the binning means include connection switches for the read-out circuits inserted between the read-out circuits and the memory elements.

10 Claims, 7 Drawing Sheets

FAST IMAGE SENSOR WITH PIXEL BINNING

TECHNICAL FIELD AND PRIOR ART

The invention relates to the field of fast imaging, i.e. fast image sensors or burst imaging devices, allowing images to be captured at rates ranging from thousands to billions of images per second.

To reach these very high image capture rates, a large amount of light must be received by each pixel of the sensor in order to reduce as far as possible the exposure time required by the pixels to receive a sufficient amount of light to capture each image. For this purpose, the pixels of fast imaging devices have large dimensions, for example dimensions that lie in the range $10 \times 10$ µm² to $50 \times 50$ µm².

Each pixel includes a photodetector and a read-out circuit associated with the photodetector. The photodetector corresponds, for example, to a photodiode. The read-out circuit corresponds, for example, to a capacitive transimpedance amplifier (or CTIA). The read-out circuit is connected to a memory element which may correspond to a storage capacitor when the signal outputted by the read-out circuit is subsequently processed in an analog manner. The memory element may further form a part of an analog-to-digital converter (or ADC), which includes, at the input, at least one capacitive load ensuring temporary storage of the signal outputted by the read-out circuit and received by the ADC. At least one capacitor may also be present between the read-out circuit and the ADC, for example in a sample and hold-type circuit, and also forming a memory element.

FIG. 1 diagrammatically illustrates one example embodiment of a pixel 10 of a fast image sensor. This pixel 10 includes a photodetector, in this case corresponding to a photodiode 12. The photodiode 12 is connected to a read-out circuit of the pixel, in this case comprising a CTIA formed by an operational amplifier 14, an integration capacitor 16 coupling the output of the amplifier 14 to a first input of the amplifier 14, and a reset switch 18 connected in parallel to the capacitor 16. The photodiode 12 is connected to the first input of the amplifier 14. A reference electric potential "Vref" is applied to a second input of the amplifier 14. The output of the amplifier 14 is connected to the input of a circuit 20 that may be an ADC or an analog memory circuit. The input of the circuit 20 has a capacitive load 19 which performs a memory function or temporary sampling of the signal outputted by the amplifier 14.

In order to increase the rate of image capture by the imaging device, pixel binning can take place. Each cluster of pixels, referred to as a macropixel, is in such a case considered as outputting single image information at the output of the macropixel. The photodetectors of a macropixel output signals to the input of a read-out circuit of a single pixel of the macropixel such that this read-out circuit reads all of the signals received from the photodetectors.

This pixel binning allows the image capture rate to be increased since the data outputted by the pixels of the same macropixel is considered to not be a plurality of data to be processed individually one after the other, but as single information to be processed. For example, if such a binning is carried out by forming macropixels formed by two pixels, the read speed of the sensor can be multiplied by two. Moreover, the total capturing surface area of a macropixel is greater than the individual surface area of each pixel, which contributes to increasing the capture rate owing to the higher sensitivity procured by the larger capturing surface area of the macropixel for each information to be processed.

FIG. 2 diagrammatically illustrates an example embodiment of two pixels 10.1 and 10.2, each formed by components similar to those of the pixel 10 described hereinabove with reference to FIG. 1, and binned to form a single macropixel. For this purpose, the photodiodes 12.1, 12.2 are connected to the input of one of the read-out circuits reading the currents outputted by the two photodiodes 12.1, 12.2. This link is obtained by closing a switch 22 allowing the photodiode 12.2 of the second pixel 10.2 to be connected to the input of the CTIA of the first pixel 10.1. The output of the CTIA of the second pixel 10.2 is disconnected from the ADC 20.2 associated with the second pixel 10.2 by opening another switch 21 inserted between the output of the CTIA of the second pixel 10.2 and the ADC 20.2. In the first pixel 10.1, the output of the CTIA is electrically connected to the ADC 20.1 associated with the first pixel 10.1.

Thus, only the CTIA of the first pixel 10.1 reads the signals outputted by the photodiodes 12.1, 12.2 of the two pixels 10.1, 10.2. When an image is captured, the two photodiodes 12.1 and 12.2 each output a current at the input of the CTIA of the first pixel 10.1, which reads the sum of these two currents. The signal outputted at the output of the CTIA of the first pixel 10.1 is stored in memory and converted by the ADC 20.1 associated with the first pixel 10.1.

With such pixel binning, the operating speed of the memory elements (the ADCs associated with the capacitive loads 19 in the examples hereinabove) is little affected by these binnings since the ADCs will process fewer pixels more quickly. However, this pixel binning requires the read-out circuits to operate more quickly compared to the initial configuration wherein all of the read-out circuits of the pixels were operating in parallel, in order to procure the desired image capture rate. However, this faster operation of the read-out circuits can create a problem as regards the charge of the capacitors forming the memory elements, whereby the time available may not suffice to ensure that, for each cluster of pixels, the read-out circuit that is active can sufficiently charge the capacitor of the memory element associated with the cluster of pixels.

One solution to this problem consists of increasing the dimensions of the components (in particular the transistors) of the read-out circuits. This oversizing of the components of the read-out circuits allows the operating rate of these circuits to be increased; however this solution then poses a problem as regards the bulkiness of the components of the read-out circuits in the pixels. Moreover, this solution is not optimal for conventional use of the sensor, i.e. when not configured to carry out pixel binning.

DESCRIPTION OF THE INVENTION

There is therefore a need to propose a fast image sensor that does not suffer from the drawbacks described hereinabove, i.e. that can be configured to carry out pixel binning compatible with a high capture rate, without oversizing the components of the read-out circuits compared to the same sensor operating without pixel binning.

For this purpose, an image sensor is proposed, comprising at least one pixel array wherein each pixel includes at least:
 a photodetector;
 a read-out circuit comprising an input coupled, or connected, to the photodetector of the pixel, and configured to output a read signal representative of a photodetection signal outputted by the photodetector;
and wherein the image sensor further includes pixel binning means configured to form macropixels such that, in each macropixel, the inputs of the read-out circuits of at least two pixels are coupled to one another, and the outputs of the read-out circuits of said at least two pixels are coupled to the input of a single memory element comprising at least one capacitor.

An image sensor is in particular proposed, which image sensor comprises at least one pixel array wherein each pixel includes at least:
 a photodetector;
 a read-out circuit comprising an input coupled to the photodetector of the pixel, an active amplifying element configured to receive, at the input, a photodetection signal intended to be outputted by the photodetector and to output a read signal representative of the photodetection signal;
and wherein:
 the image sensor further includes pixel binning means configured to form macropixels such that, in each macropixel, the inputs of the read-out circuits of at least two pixels are coupled to one another, and the outputs of the read-out circuits of said at least two pixels are coupled to the input of a single memory element comprising at least one capacitor;
 the output of each read-out circuit is coupled to an input of a memory element that is different from those to which the outputs of the read-out circuits of the other pixels are connected;
 the pixel binning means include connection switches for the read-out circuits inserted between the outputs of the read-out circuits and the inputs of the memory elements.

In this image sensor, during pixel binning, the read-out circuits of the pixels binned into the same macropixel are coupled, or connected, in parallel and behave as one larger resulting read-out circuit, reading the sum of the photodetection signals outputted by the photodetectors. The read signals outputted at the output of the read-out circuits are then sent to the input of a single memory element. This parallel operation of the read-out circuits allows the image sensor to operate at high capture rates, without this posing charge problems for the capacitors of the memory elements since in this configuration, thanks to the presence of the active amplifying elements in the read-out circuits, the fan-outs, or output currents, of the read-out circuits cumulate, which allows fast charging of the capacitors of the memory elements, without having to oversize the components of the read-out circuits compared to a similar image sensor wherein the pixels are not binned.

A macropixel designates a plurality of binned pixels such that, when reading the pixels, the read signals outputted by the read-out circuits of these pixels are considered jointly as a single global information representative of the light signal captured at the whole of the macropixel assembly.

In each read-out circuit, the amplifying element is qualified as "active" since it is capable of generating a current.

The term "coupled" is used herein to denote a link or a connection, preferably electrical, which can be direct or indirect, between two elements coupled to one another, i.e. with or without an intermediate element inserted between the two elements coupled to one another.

Each macropixel is formed by at least two pixels, and advantageously includes a number of pixels in the range of about 2 to 10 pixels.

The read-out circuits of the image sensor may be similar to one another.

A memory element corresponds, herein, to a component or an electronic circuit performing a memory function that may or may not be temporary. The primary function of the memory element may be a memory function, or it may be another function such as, for example, an analog-to-digital conversion function or a temporary sampling function when the conversion element corresponds to a capacitive load of an ADC.

The output of each read-out circuit is coupled to an input of a memory element that is different from those to which the outputs of the read-out circuits of the other pixels are connected, and the pixel binning means include connection switches for the read-out circuits inserted between the outputs of the read-out circuits and the inputs of the memory elements. During operation of the image sensor wherein the pixels are binned to form macropixels, a part of the connection switches of the read-out circuits may be open so that, in each macropixel, the outputs of the read-out circuits of the pixels of the macropixel are only coupled to a single memory element, ensuring at least the storage in memory of the read signals outputted by the read-out circuits of the pixels forming the macropixel. Owing to the fact that each read-out circuit includes an active amplifying element, this pixel binning enables an increase in the bandwidth of the sensor to be obtained thanks to the accumulation of the output signals of the read-out circuits.

By keeping these connection switches closed, the sensor can operate in a conventional manner, that is to say without pixel binning, whereby each pixel is connected to the memory element associated therewith.

The pixel array may be arranged in a first substrate, and the memory elements may be arranged in a second substrate that is separate from and superimposed on the first substrate. The read-out circuits may be arranged in the first substrate, for example within the pixels, or in the second substrate.

The dimensions of each pixel may lie in the range of about $10\times10$ $\mu m^2$ to $50\times50$ $\mu m^2$.

The photodetection signals may correspond to photodetection currents, and the output signals of the read-out circuits, referred to as read signals, may correspond to read voltages.

Each memory element may correspond to a capacitive load of an analog-to-digital converter (ADC), or to a storage capacitor, or to a capacitor present between the read-out circuit and the ADC.

Each photodetector may include at least one photodiode.

According to a first embodiment, each read-out circuit may include at least one capacitive transimpedance amplifier forming the active amplifying element of the read-out circuit.

Each capacitive transimpedance amplifier may include at least:
 an operational amplifier;
 an integration capacitor coupling the output of the operational amplifier to a first input of the operational amplifier, and
 a reset switch coupled in parallel to the integration capacitor;
 a connection switch of the integration capacitor inserted between the input of the operational amplifier and a first electrode of the integration capacitor.

In each macropixel, when the image sensor operates by pixel binning, the connection switch of the integration capacitor of a single read-out circuit may be in the closed position, whereby the one or more other connection switches of the integration capacitor of the one or more other read-out circuits of the macropixel may be in the open position, so as to only couple a single integration capacitor of one of the read-out circuits in parallel with the operational amplifiers of the read-out circuits of the macropixel. The fact that only one integration capacitor is left connected within a macropixel enables the integration of all of the photocurrents generated by the photodetectors of the macropixel over a lower capacitor, and thus procures a stronger voltage gain at the output of the read-out circuit since this capacitor will be filled more quickly.

According to a second embodiment, each read-out circuit may include at least:
- a first reset transistor of the pixel,
- a second transistor in a common-drain assembly comprising the gate thereof coupled to the photodetector associated with the read-out circuit,
- a current source coupled to the source of the second transistor and forming, with the second transistor, the active amplifying element of the read-out circuit,
- a third selection transistor configured for connecting the read-out circuit to the memory element associated with said read-out circuit, comprising a first source or drain electrode coupled to the source of the second transistor and a second source or drain electrode forming the output of the read-out circuit which is coupled to said memory element.

In this second embodiment, each read-out circuit may further include:
- a memory node coupled to the gate of the second transistor, forming a capacitor coupled in parallel with the first transistor,
- a fourth transfer transistor inserted between the gate of the second transistor and the input of the read-out circuit.

Moreover, the output of each memory element may be coupled to a transistor in a common-drain assembly, the gate whereof is coupled to the capacitor of the memory element and the drain whereof is coupled to a current source.

Alternatively, each read-out circuit may be associated with a plurality of subpixels configured to detect different wavelength ranges and intended to be successively read by the read-out circuit, whereby the read-out circuit may include a plurality of transfer transistors each comprising a first source or drain electrode coupled to the photodetector of one of the subpixels associated with the read-out circuit.

BRIEF DESCRIPTION OF THE FIGURES

The present invention will be better understood after reading the following description of example embodiments, given for purposes of illustration only and not intended to limit the scope of the invention, with reference to the accompanying figures, wherein.

Identical, similar or equivalent parts of the different figures described herein below bear the same reference numerals in order to ease passage from one figure to another.

The different parts shown in the figures are not necessarily shown according to a uniform scale in order to make the figures easier to read.

The different possibilities (alternatives and embodiments) must be understood as not being exclusive with regard to one another and can be combined with one another.

DETAILED DESCRIPTION OF SPECIFIC EMBODIMENTS

Figure 1:
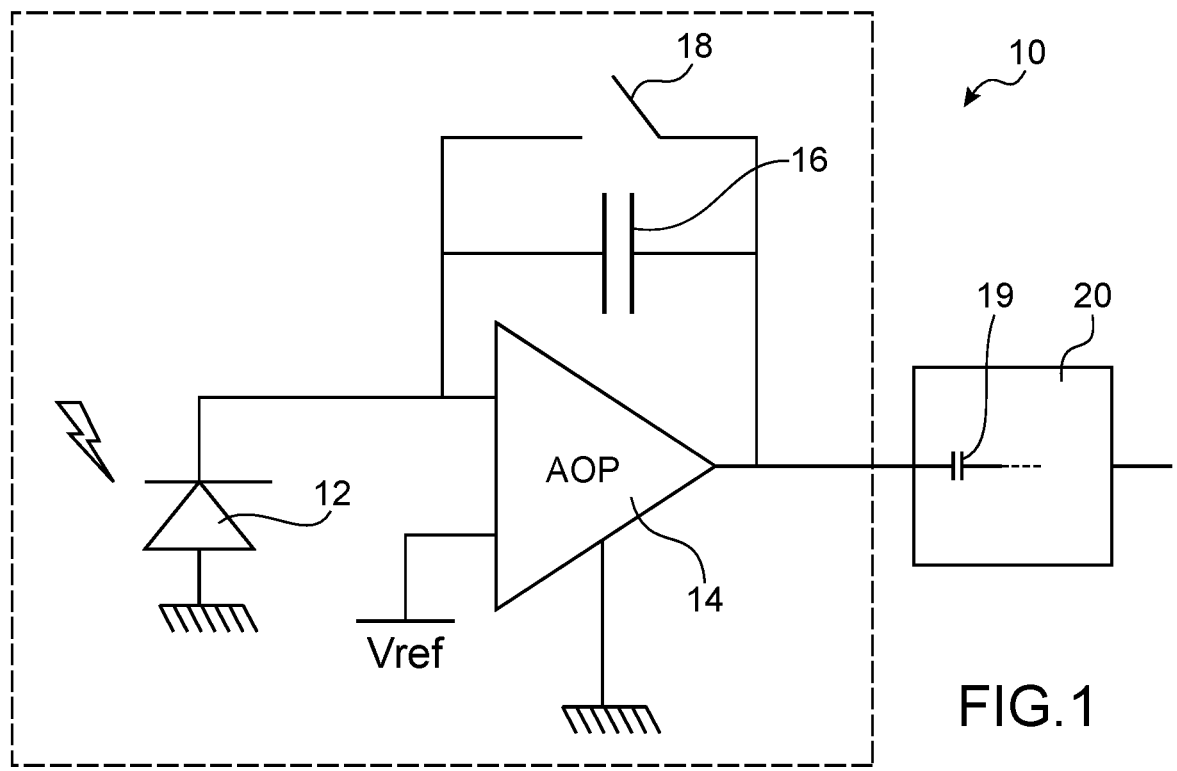
FIG. 1 shows one example embodiment of a pixel of a fast image sensor of the prior art.
Figure 2:
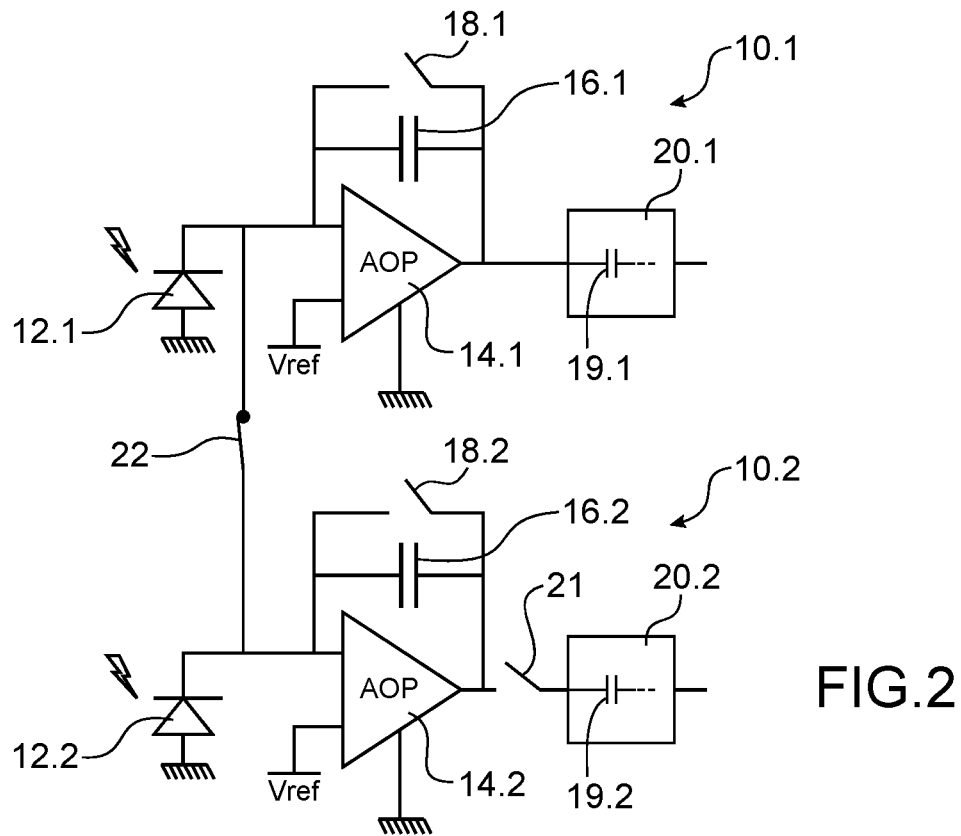
FIG. 2 shows one example embodiment of two binned pixels forming a macropixel of a fast image sensor of the prior art.
Figure 3:
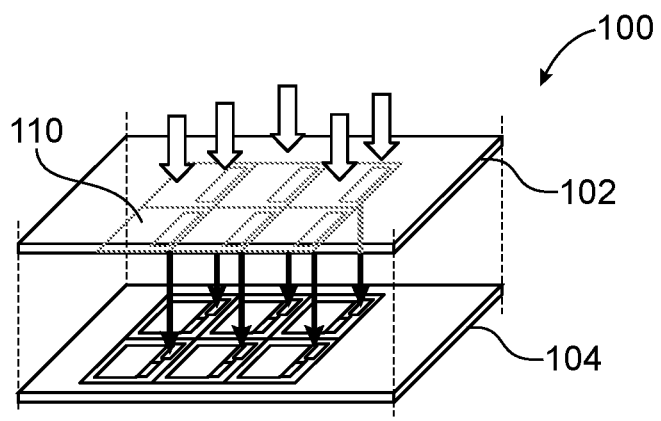
FIG. 3 diagrammatically shows an image sensor according to one specific embodiment.

Reference is firstly made to FIG. 3, which diagrammatically shows an image sensor 100 according to a specific example embodiment.

The sensor 100 corresponds to a fast image sensor or burst imaging device. In this example embodiment, the sensor 100 is produced in the form of a 3D (three-dimensional) electronic circuit and includes a pixel array 110 formed in a first substrate 102 and electronic processing circuits made in the first substrate 102 and in a second substrate 104 that is separate from the first substrate 102 and superimposed on the first substrate 102.

The sensor 100 includes pixel binning means, allowing macropixels to be formed from the pixels 110 of the array, in order to increase the image capture rate of the sensor 100 (nonetheless generating images each comprising fewer pixels than the images obtained when the pixels are not binned into macropixels).

Figure 4:
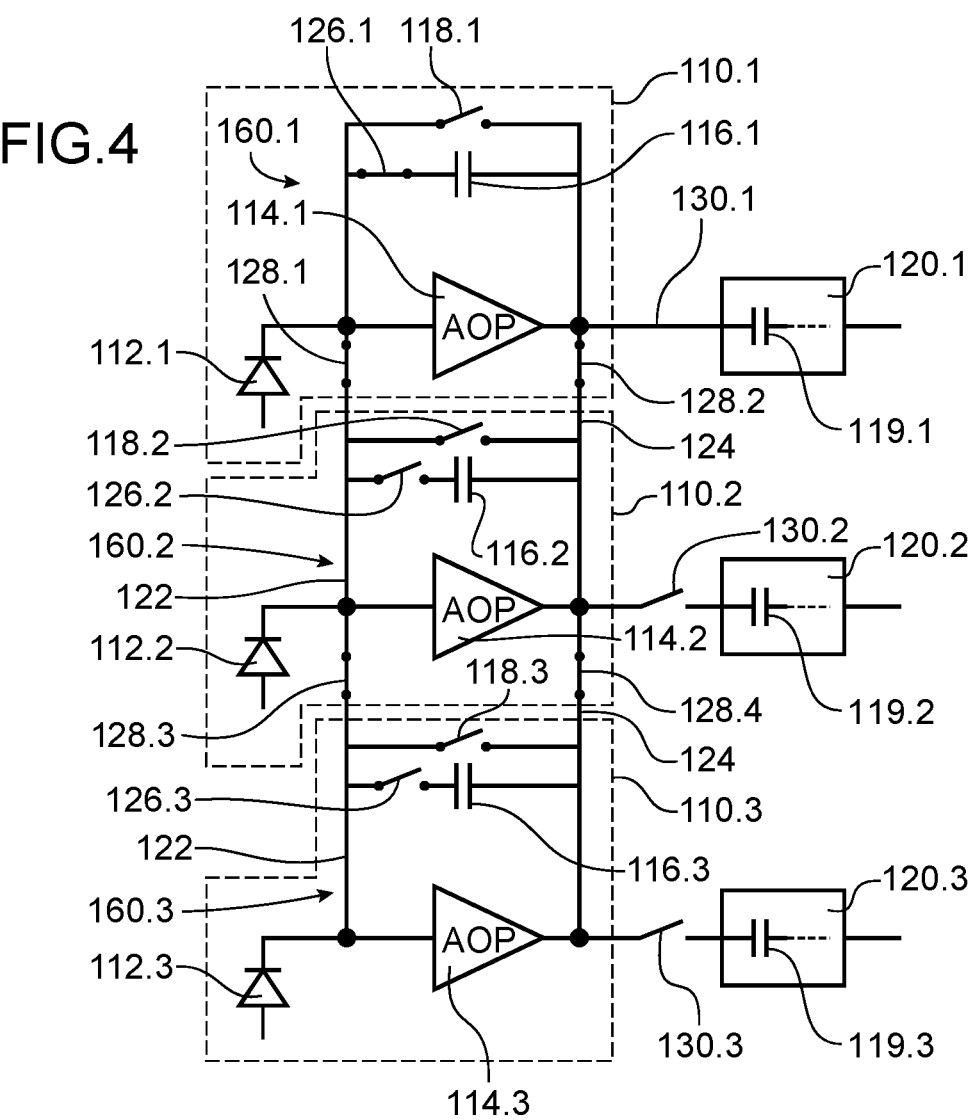
FIG. 4 shows an image sensor comprising a plurality of pixels binned into a macropixel, according to a first embodiment.

FIG. 4 shows three pixels 110, having the reference numerals 110.1, 110.2 and 110.3, of the sensor 100 binned into a single macropixel, according to a first embodiment.

Each of the three pixels 110 includes a photodetector 112 (having the reference numerals 112.1, 112.2 and 112.3 in FIG. 4) corresponding, for example, to a photodiode.

Each of the three pixels 110 further includes a read-out circuit 160 (having the reference numerals 160.1-160.3 in FIG. 4). Each read-out circuit 160 is produced within one of the pixels. In this first embodiment, the read-out circuits 160 include active amplifying elements corresponding to CTIAs, each comprising an operational amplifier (AOP) 114 (having the reference numerals 114.1, 114.2 and 114.3 in FIG. 4), an integration capacitor 116 (having the reference numerals 116.1, 116.2 and 116.3 in FIG. 4) and a reset switch 118 (having the reference numerals 118.1, 118.2 and 118.3 in FIG. 4).

In this case, the photodetectors 112 and the read-out circuits 160 associated therewith are made in the first substrate 102. The output of each of the read-out circuits 160 is coupled to a memory element which corresponds, in this case, to a capacitive load 119 (having the reference numerals 119.1, 119.2 and 119.3) of an ADC 120 (having the reference numerals 120.1, 120.2 and 120.3). In this case, the ADCs 120 are made in the second substrate 104.

First electrical links 122 electrically couple the inputs of the read-out circuits 160 to one another, and second electrical links 124 electrically couple the outputs of the read-out circuits 160 to one another. The read-out circuits 160 are thus coupled in parallel with one another.

Connection switches 126 (having the reference numerals 126.1, 126.2 and 126.3 in FIG. 4) of the integration capacitors 116 are inserted between first electrodes of the integration capacitors 116 and the inputs of the amplifiers 114, and connection switches 128 (having the reference numerals 128.1 to 128.4 in FIG. 4) of the pixels 110 are inserted on the first and second electrical links 122, 124, between the pixels 110.

In the example shown in FIG. 4, the switches 126.2, 126.3 are in the open position, and the switch 126.1 is in the closed position so that only the integration capacitor 116.1 is coupled in parallel to the three amplifiers 114, the two other integration capacitors 116.2 and 116.3 being disconnected from the read-out circuits 160.

In the configuration shown in FIG. 4, the three pixels 110.1, 110.2 and 110.3 form a single macropixel, the switches 128.1 to 128.4 being in the closed position in order to connect in parallel the read-out circuits 160 of the three pixels 110.1, 110.2 and 110.3. When capturing images, the three photodetectors 112.1, 112.2, 112.3 output photodetection currents over the inputs of the three operational amplifiers 114.1, 114.2, 114.3. Thus, the three amplifiers 114.1, 114.2, 114.3 of the three read-out circuits 160 cooperate in order to read the photodetection signals outputted by the photodiodes 112 of the three pixels 110.1, 110.2 and 110.3.

The output of each of the read-out circuits 160 of the pixels 110 is coupled to the input of one of the ADCs 120. In order for the signal read by the three read-out circuits 160 to be sent to the input of a single ADC 120, connection switches 130 (having the reference numerals 130.1, 130.2 and 130.3 in FIG. 4) of the read-out circuits 160 are inserted between the output of each read-out circuit 160 and the input of each ADC 120. In the configuration shown in FIG. 4, the two switches 130.2 and 130.3 are in the open position and the switch 130.1 is in the closed position so that only the ADC 120.1 receives, at the input thereof, the read signals outputted by the read-out circuits 160 of the pixels 110.

The paralleling of the amplifiers 114 allows the fan-outs thereof, i.e. the output current thereof, to be cumulated so that the charge of the storage capacitor of the ADC 120.1 is accelerated thanks to the pixel binning carried out.

The sensor 100 includes other electronic processing elements to which the outputs of the ADCs 120, or more generally the outputs of the read-out circuits 160, are coupled. These electronic elements are not described in detail here, nor are they described in detail for the other embodiments.

In the first embodiment described hereinabove, the memory elements to which the outputs of the read-out circuits of the pixels are coupled correspond to capacitive loads of the ADCs. Alternatively, these memory elements may correspond to electronic circuits that are different to these ADCs, however that include at least one capacitor. Such memory circuits are, for example, described in the document entitled "In-Pixel Storage Techniques for CMOS Burst-Mode Ultra-High-Speed Imagers" by L. Wu et al., 2017: Conference: 2017 International Image Sensors Workshop, Hiroshima, Japan. According to another alternative embodiment, the memory elements to which the outputs of the read-out circuits of the pixels are coupled may correspond to temporary storage capacitors of circuits of the sample and hold type. According to another alternative embodiment, for a sensor operating in analog mode, the memory elements may correspond to storage capacitors.

Moreover, the pixel binning described hereinabove with reference to the pixels in FIG. 4 is such that each macropixel may include a number of pixels in the range of about 2 to 10.

Figure 5:
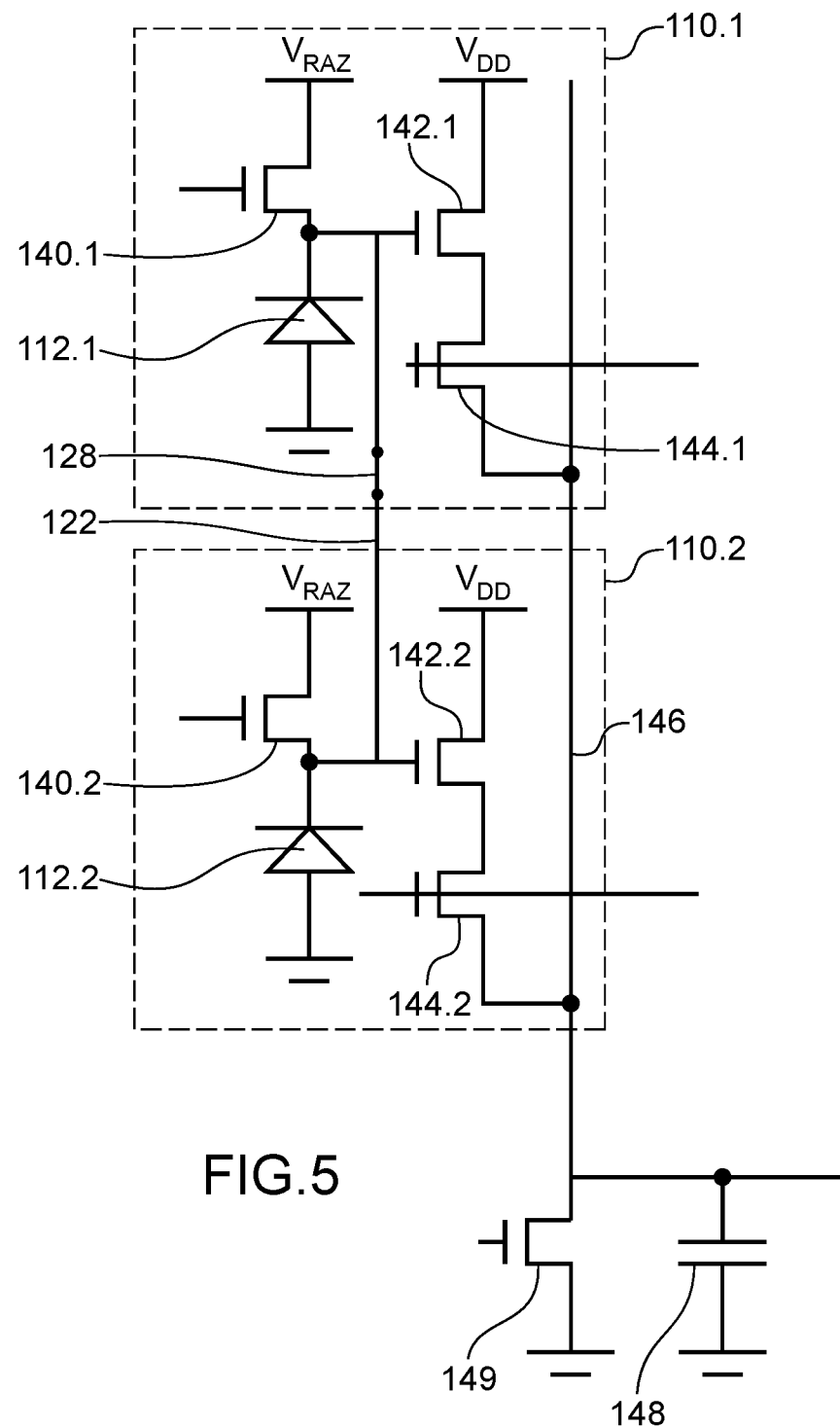
FIG. 5 shows an image sensor comprising a plurality of pixels binned into a macropixel, according to one example embodiment.

In the first embodiment described hereinabove, the read-out circuit 160 of each pixel 110 includes a CTIA. FIG. 5 shows two pixels 110.1, 110.2 of the sensor 100 according to one example that is helpful for understanding the invention and wherein the read-out circuits of the pixels 110 do not include any CTIAs, but correspond to 3T-type circuits (having three transistors). The transistors of the read-out circuits correspond, for example, to field-effect transistors, advantageously MOSFETs.

In this example, each read-out circuit includes a first transistor 140 (having the reference numerals 140.1 and 140.2 in FIG. 5) allowing the pixels 110 to be reset, via the application of the reset voltage $V_{RAZ}$ at the terminals of the photodetectors 112 when the first transistors 140 are in the ON-state.

Each read-out circuit further includes a second transistor 142 (having the reference numerals 142.1 and 142.2 in FIG. 5), in a common-drain assembly (also referred to as a "source follower"), the gate whereof that forms the input of the read-out circuit is coupled to the photodetector 112 associated with the read-out circuit. Since the two pixels 110.1, 110.2 are, in this case, binned to form a macropixel, the gates of the second transistors 142.1 and 142.2 are electrically coupled to one another by the electrical link 122 and the switch 128, thus coupling the inputs of the two read-out circuits of the pixels 110.1, 110.2 to one another. The switch 128 enables the photodetectors 112 or be united or separated, depending on the desired operating mode (binning or otherwise).

Each read-out circuit further includes a third transistor 144 (having the reference numerals 144.1 and 144.2 in FIG. 5), configured to connect the read-out circuit to the output line 146 and comprising a first source or drain electrode (drain electrode in the case of a third nMOS transistor 144 as shown in the example in FIG. 5) coupled to the second transistor 142 (connected to the source of the second nMOS transistor 142 in the example in FIG. 5), and a second source or drain electrode (source electrode in the example in FIG. 5) forming the output of the read-out circuit and which is coupled to the output line 146 of the pixel array. The read-out circuits of the two pixels 110.1, 110.2 output, over the line 146, the read signals outputted by the second transistors 142 when the third transistors 144 are in the ON-state. Thus, the outputs of the read-out circuits of two pixels 110.1, 110.2 are electrically coupled to one another so as to output single image information per macropixel.

The outputs of the read-out circuits of the two pixels 110.1, 110.2 are coupled, via the line 146, to the input of a memory element corresponding, in this case, to a storage capacitor 148. A transistor 149 enables the read-out circuit to be biased, which imposes a read voltage in the storage capacitor 148 via the output line 146.

As opposed to the first embodiment, the paralleling of the read-out circuits in this case does not allow the currents of the signals outputted by the second transistors 142 to be cumulated since it is the transistor 149 present at the bottom of each column that imposes the read voltage applied at the input of the memory circuit corresponding to the storage capacitor 148.

Figure 7:
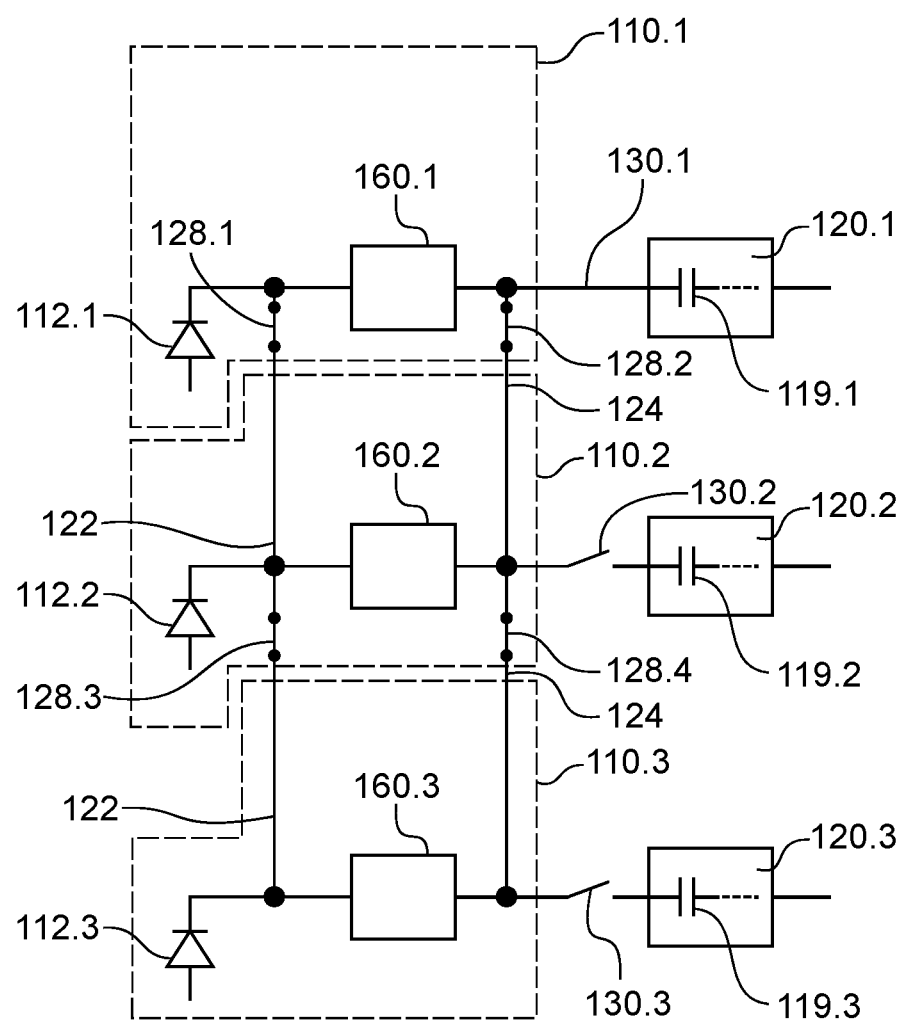
FIG. 7 shows an image sensor comprising a plurality of pixels binned into a macropixel, according to a second embodiment.

FIG. 7 shows three pixels 110, having the reference numerals 110.1, 110.2 and 110.3, of the sensor 100 binned into a single macropixel, according to a second embodiment.

All of these pixels include the elements previously described with reference to the first embodiment shown in FIG. 4. However, as regards the first embodiment, the read-out circuit (having the reference numeral 160 in FIG. 7) of each pixel 110 comprises an active amplifying element that is different from that described hereinabove in the first embodiment.

Figure 8:
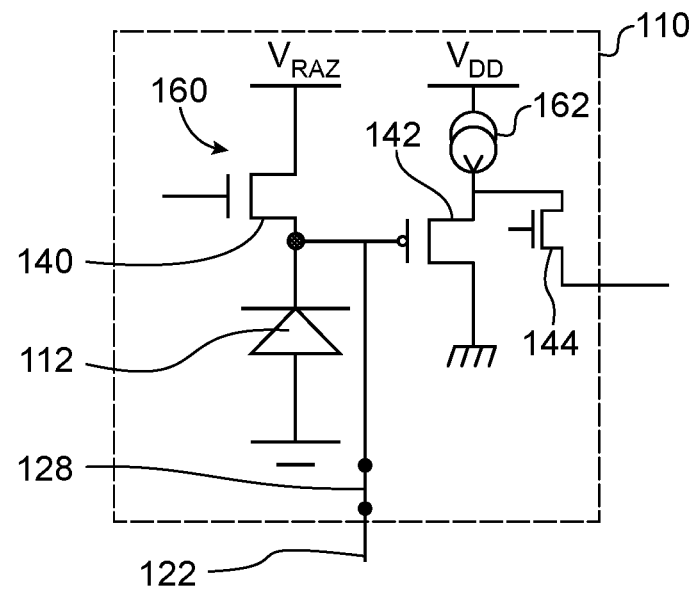
FIGS. 8 to 10 show example embodiments of pixels of the image sensor according to the second embodiment.

FIG. 8 shows a first example embodiment of such a pixel 110 including an active amplifying element that does not correspond to a CTIA. In this first example, which corresponds to a 3T pixel, the active amplifying element of the read-out circuit 160 of the pixel 110 is formed by the transistor 142 in a common-drain assembly and a current source 162, for example formed by a transistor, which is coupled to the source of the transistor 142. Thanks to this active amplifying element, during pixel binning, the output currents of the binned pixels are cumulated and stored in memory in the same memory element.

Figure 9:
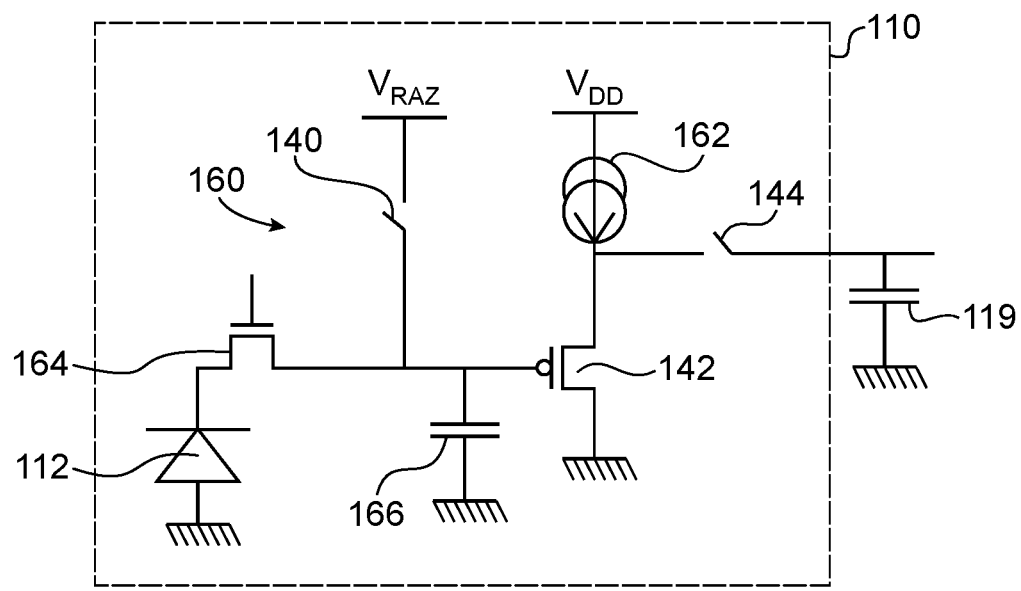

FIG. 9 shows a second example embodiment of such a pixel 110 including an active amplifying element that does not correspond to a CTIA. In this second example, which corresponds to a 4T pixel, the active amplifying element of the read-out circuit 160 of the pixel 110 is formed by the transistor 142 in a common-drain assembly and a current source 162, for example formed by a transistor, which is coupled to the source of the transistor 142, similarly to the first example in FIG. 8. In addition to the pixel elements in FIG. 8, this pixel 110 includes a transfer transistor 164 inserted between the gate of the transistor 142 and the input of the read-out circuit 160, in addition to a memory node coupled to the gate of the transistor 142 and forming a capacitor 166 coupled in parallel with the transistor 140.

Figure 10:
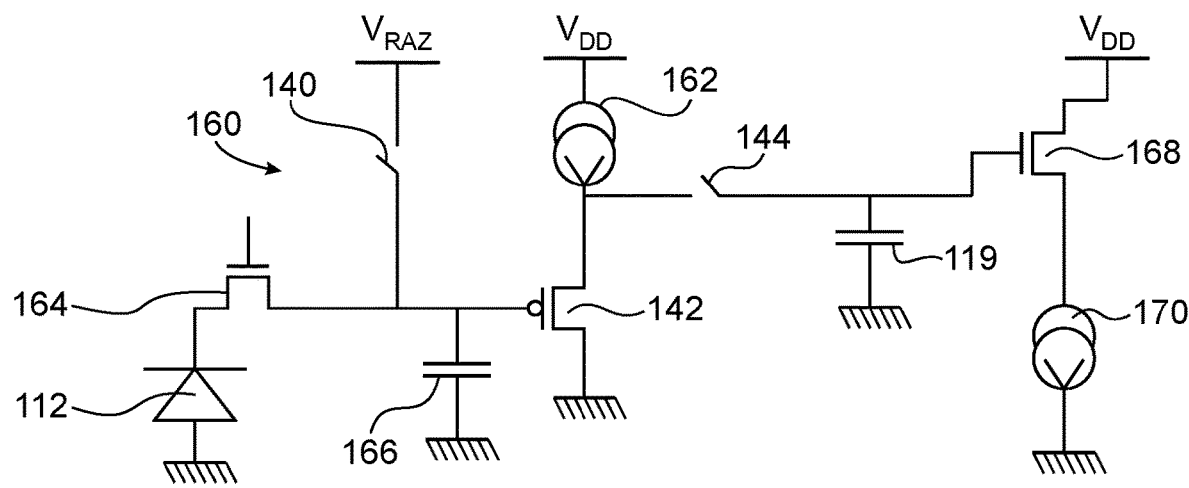

Advantageously, the output of each memory element is coupled to a transistor 168 in a common-drain assembly, the gate whereof is coupled to the capacitor 119 of the memory element. The drain of the transistor 168 is coupled to a current source 170. The transistor 168 and the current source 170 form a second active amplifying element. Such a configuration is illustrated in FIG. 10.

Figure 6:
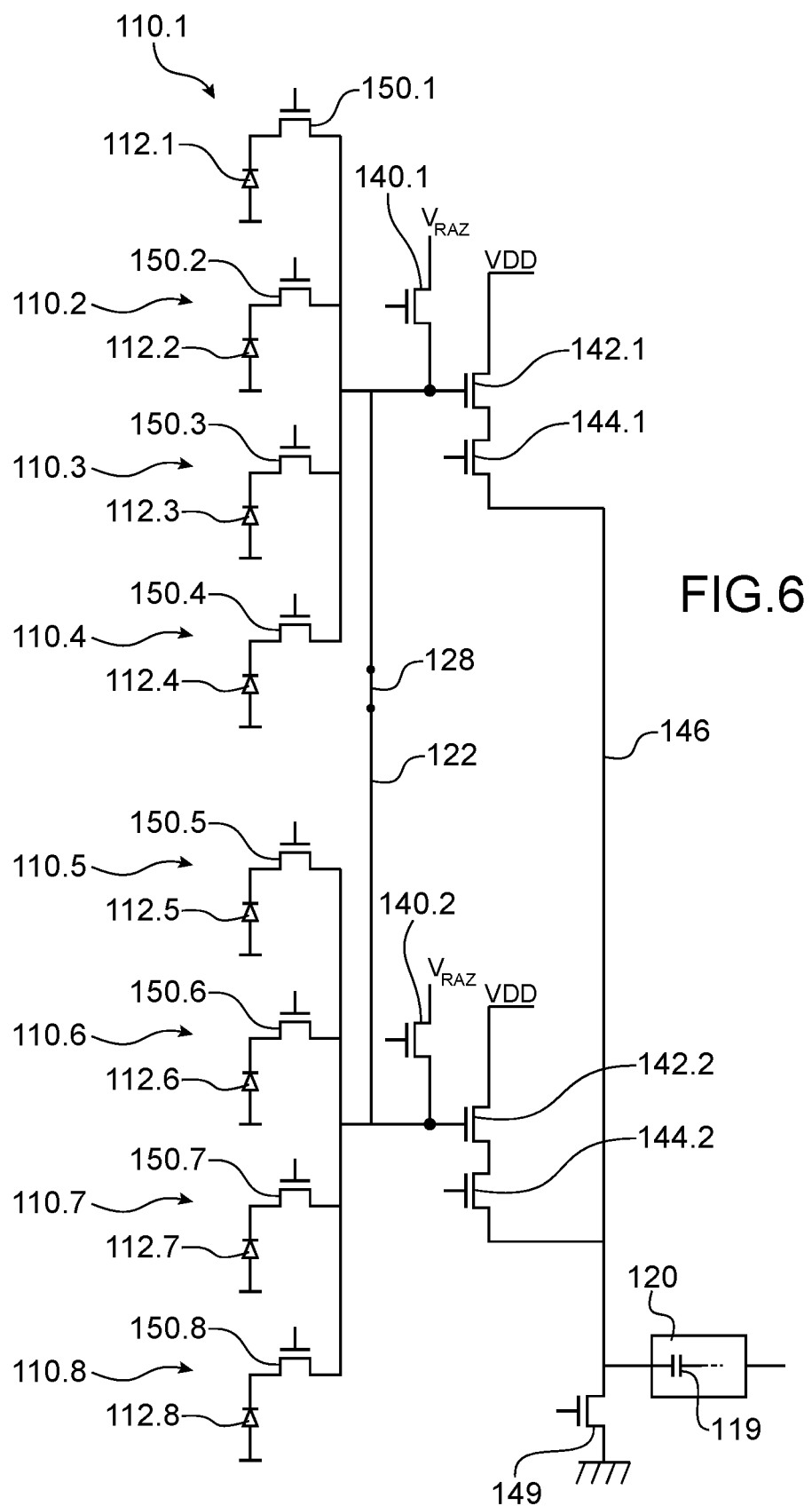
FIG. 6 shows an image sensor comprising a plurality of pixels binned into a macropixel, according to another example embodiment.

FIG. 6 shows eight pixels 110.1-110.8 of the sensor 100 according to another example that is helpful for understanding the invention, wherein the read-out circuits of the pixels 110 correspond to circuits of the 1.75 T type (having 1.75 transistors). The transistors of the read-out circuits correspond, for example, to field-effect transistors, advantageously MOSFETs.

In the two aforementioned embodiments, all of the pixels binned into each macropixel are intended to be read simultaneously, and each photodetector includes a read-out circuit associated therewith. In the third embodiment described here, each read-out circuit is associated with a plurality of pixels intended to be successively read by the read-out circuit and which can be configured to detect different wavelength ranges. In the example shown in FIG. 6, the pixels 110 are arranged to form a Bayer array such that:

the pixels 110.1 and 110.5 are intended to detect wavelengths corresponding to the color blue;
the pixels 110.2 and 110.6 are intended to detect wavelengths corresponding to the color red;
the pixels 110.3, 110.4, 110.7 and 110.8 are intended to detect wavelengths corresponding to the color green;

Other configurations are possible, in terms of number of pixels and/or wavelength ranges detected.

The pixels 110.1-110.4 are associated with a first read-out circuit, and the pixels 110.5-110.8 are associated with a second read-out circuit.

Each pixel 110 includes a photodetector 112 (having the reference numerals 112.1-112.8 in FIG. 6). Each photodetector 112 is coupled to one of the two read-out circuits of the pixels 110.

The read-out circuits of the pixels 110 include transfer transistors (also referred to as transfer gates) 150 (having the reference numerals 150.1-150.8) each comprising a first source or drain electrode coupled to the photodetector 112 of one of the pixels associated with the read-out circuit, each allowing, in the ON-state, the photodetection signal generated by the photodetector 112 to be outputted to the read-out circuit associated therewith.

The other components forming the read-out circuits are shared by a plurality of pixels, in this case by four pixels. For the four pixels 110.1-110.4, these components correspond to:

a first transistor 140.1 allowing the pixels 110.1-110.4 to be reset by applying the supply voltage $V_{RAZ}$ to the terminals of the photodetectors 112 when the first transistor 140.1 is in the ON-state and when the transfer transistors 150 of the pixels to be reset are also in the ON-state;

a second transistor 142.1 in the common-drain assembly and comprising a gate thereof forming the input of the read-out circuit which is coupled to the photodetectors 112 of the pixels 110.1-110.4;

a third transistor 144.1 configured for connecting the read-out circuit to the output line 146, and thus authorizing sequential reading of the pixels associated with the read-out circuit, comprising a first source or drain electrode coupled to the second transistor 142.1 and a second source or drain electrode forming the output of the read-out circuit which is coupled to the output line 146 of the pixel array. The read-out circuit of the pixels 110.1-110.4 outputs a signal over the output line 146 when the third transistor 144 is in the ON-state.

Moreover, the read-out circuit of the other four pixels 110.5-110.8 is similar to that of the four pixels 110.1-110.4.

Since the pixels 110.1-110.8 are, in this case, binned to form a macropixel, the gates of the second transistors 142.1 and 142.2 are electrically coupled to one another by the electrical link 122 and the switch 128 (in the closed position during pixel binning), thus coupling the inputs of the two read-out circuits of the pixels 110.1-110.8 to one another.

Moreover, the outputs of the read-out circuits of the pixels 110.1-110.8 are electrically coupled to one another so as to output, at a given moment in time, single image information per macropixel.

The outputs of the read-out circuits of the two pixels 110.1, 110.2 are coupled, via the output line 146, to the input of a memory circuit, the data whereof is, in this case, converted into digital data thanks to the storage capacitor present in the ADC 120.

The principle described hereinabove with reference to FIG. 6 may be applied to the invention, it being considered that each pixel includes a plurality of subpixels configured to detect different wavelength ranges and intended to be successively read by the read-out circuit. For example, the photodetectors 112.1-112.4 may be considered as forming a part of four subpixels of a first pixel of the sensor 100, and the photodetectors 112.5-112.8 may be considered as forming a part of four subpixels of a second pixel of the sensor 100. In such a case, the read-out circuit 160 of each pixel includes a plurality of transfer transistors (transistors 150.1-150.4 for the first pixel, and transistors 150.5-150.8 for the second pixel), each comprising a first source or drain electrode coupled to the photodetector of one of the subpixels associated with the read-out circuit 160. The read-out circuits 160 of each pixel may correspond to one of those described hereinabove with reference to FIGS. 4 and 8-10.

In the aforementioned embodiments, the signals outputted by all of the pixels are read. According to another pixel binning example, certain pixels within a macropixel may potentially be inactive. For example, macropixels may be produced, each formed by ten pixels and wherein the information outputted by only five of these ten pixels is read, the other five pixels being considered to be inactive (the information outputted by these five inactive pixels is not read). The information outputted by the five read pixels is combined to form single read information of the macropixel. Such binning allows the read rate of the imaging device to be multiplied by ten.

The invention claimed is:

1. An image sensor comprising at least one pixel array wherein each pixel includes at least:
   a photodetector;
   a read-out circuit comprising an input coupled to the photodetector of the pixel and an active amplifying element configured to receive, at the input, a photodetection signal intended to be outputted by the photodetector and to output a read signal representative of the photodetection signal;
   and wherein:
   the image sensor further includes pixel binning means configured to form macropixels such that, in each macropixel, the inputs of the read-out circuits of at least two pixels are coupled to one another, and the outputs of the read-out circuits of said at least two pixels are coupled to the input of a single memory element comprising at least one capacitor;
   the output of each read-out circuit is coupled to an input of a memory element that is different from those to which the outputs of the read-out circuits of the other pixels are connected;
   the pixel binning means include connection switches for the read-out circuits inserted between the outputs of the read-out circuits and the inputs of the memory elements.

2. The image sensor according to claim 1, wherein the pixel array is arranged in a first substrate, and the memory elements are arranged in a second substrate that is separate from and superimposed on the first substrate.

3. The image sensor according to claim 1, wherein the photodetection signals correspond to photodetection currents, and the read signals correspond to read voltages.

4. The image sensor according to claim 1, wherein each memory element corresponds to a capacitive load of an analog-to-digital converter, or to a storage capacitor, or to a capacitor present between the read-out circuit and the analog-to-digital converter.

5. The image sensor according to claim 1, wherein each read-out circuit includes at least one capacitive transimpedance amplifier forming the active amplifying element of the read-out circuit.

6. The image sensor according to claim 5, wherein each capacitive transimpedance amplifier includes at least:
   an operational amplifier;
   an integration capacitor coupling the output of the operational amplifier to a first input of the operational amplifier, and
   a reset switch coupled in parallel to the integration capacitor;
   a connection switch of the integration capacitor inserted between the input of the operational amplifier and a first electrode of the integration capacitor.

7. The image sensor according to claim 1, wherein each read-out circuit includes at least:
   a first reset transistor of the pixel,
   a second transistor in a common-drain assembly and comprising the gate thereof coupled to the photodetector associated with the read-out circuit,
   a current source coupled to the source of the second transistor and forming, with the second transistor, the active amplifying element of the read-out circuit,
   a third selection transistor configured for connecting the read-out circuit to the memory element associated with said read-out circuit, comprising a first source or drain electrode coupled to the source of the second transistor and a second source or drain electrode forming the output of the read-out circuit which is coupled to said memory element.

8. The image sensor according to claim 7, wherein each read-out circuit further includes:
   a memory node coupled to the gate of the second transistor and forming a capacitor coupled in parallel with the first transistor,
   a fourth transfer transistor inserted between the gate of the second transistor and the input of the read-out circuit.

9. The image sensor according to claim 7, wherein the output of each memory element is coupled to a transistor in a common-drain assembly, the gate whereof is coupled to the capacitor of the memory element and the drain whereof is coupled to a current source.

10. The image sensor according to claim 1, wherein each read-out circuit is associated with a plurality of subpixels configured to detect different wavelength ranges and intended to be successively read by the read-out circuit, whereby the read-out circuit includes a plurality of transfer transistors each comprising a first source or drain electrode coupled to the photodetector of one of the subpixels associated with the read-out circuit.

* * * * *